Sept. 27, 1960
F. E. DICKEY ET AL
2,954,522
TRANSIENT FREQUENCY METER
Filed April 1, 1957
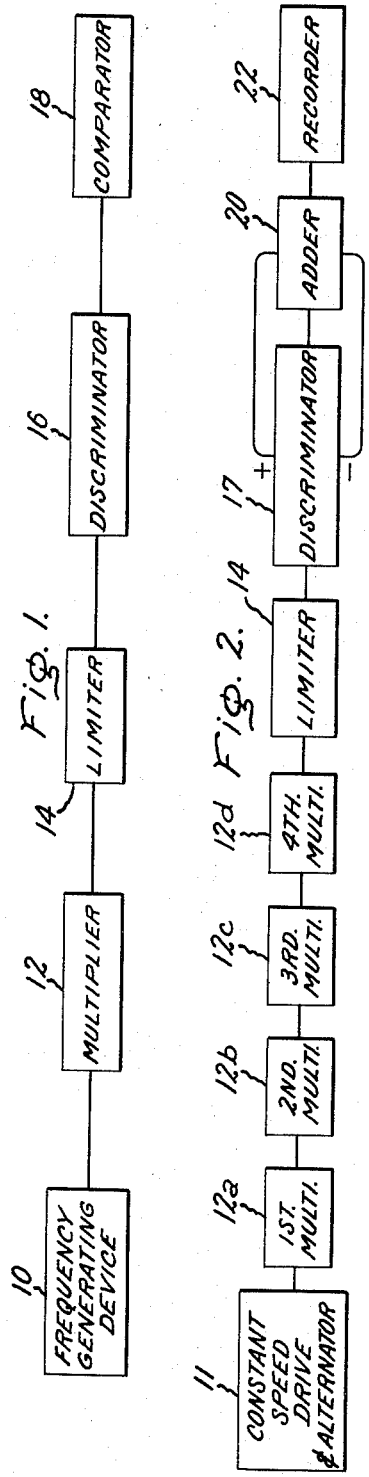
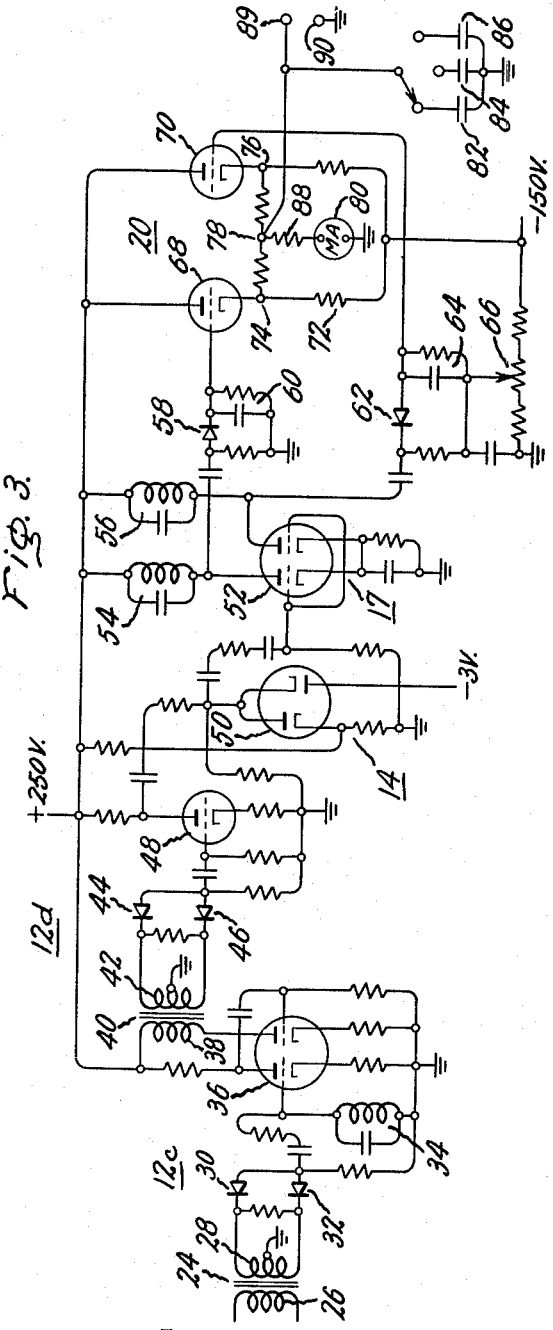
Inventors:
Fred E. Dickey,
Thomas E. Coppinger,
by
Their Attorney.

United States Patent Office 2,954,522
Patented Sept. 27, 1960

2,954,522
TRANSIENT FREQUENCY METER

Fred E. Dickey and Thomas E. Coppinger, Schenectady, N.Y., assignors to General Electric Company, a corporation of New York Filed Apr. 1, 1957, Ser. No. 649,817

7 Claims. (Cl. 324—78)

This invention relates to a transient frequency meter and, more particularly, to a transient frequency meter that is capable of measuring frequency changes of very short duration.

The transient frequency meter of this invention is especially adapted to test the output of constant speed drives to determine if the speed of the drive is substantially constant within the allowable limits of deviation. Constant speed drives are used as a link between the aircraft engines and the alternator that is used to generate the A.-C. power for the aircraft electrical systems. Due to the equipment being run from such A.-C. power and the reliance placed on this equipment, such as automatic flight control systems and the like, it is very important that the frequency of the A.-C. power remain as nearly constant as possible despite changes of engine speed and power load. In military aircraft close limits are set on the allowable A.-C. power frequency deviations.

As the constant speed drives used in aircraft become more refined, the frequency swings in the A.-C. power of the alternator become small and of short duration. In order to determine whether these constant speed drives perform within allowable limits, it is necessary to either measure the frequency change that occurs in the alternator output or to measure the changes in speed of the constant speed drive. The prior art devices in general are insufficient to measure the short frequency or speed transients that occur in present constant speed drive and alternator combinations. For example, Lissajous figures are insufficient because they cannot be read under transient frequency conditions and the counter-type frequency meters are not rapid enough to measure the small transients because their averaging circuits require too long a time constant. Tachometers have been used but are unable to change voltage fast enough to measure transient speed changes of short duration. Further, it is difficult to attach a tachometer to a totally enclosed drive system such as is used in present day constant speed drive and alternator systems.

It has also been found desirable to use equipment for testing constant speed drive and alternator systems where the testing equipment uses only the A.-C. output of the alternator as the input to the equipment so that no mechanical or electrical changes have to be made to the drive to accommodate the test equipment. It is also important that the test equipment used have as low a drift as possible so that the steady-state frequency before and after the transient frequency changes can be compared. A further requirement is that the test equipment utilizing the output of the alternator be insensitive to alternator voltage changes which accompany the transient frequency changes.

The transient frequency meter of this invention is also useful to check oscillators and frequency generators to determine the frequency changes that occur due to changes in load or fluctuation in source voltage. It may also be used to test low frequency A.-C. tachometers to detect transient frequency changes of the tachometer output. Other types of equipment which provide a frequency output may also be tested with the equipment of this invention.

Therefore, it is an object of this invention to provide test equipment for testing constant speed drive and alternator systems that is capable of measuring transient frequency changes of very short duration.

It is a further object of this invention to provide test equipment for constant speed drive and alternator systems that uses only the A.-C. output of the alternator as the input to such test equipment.

Still another object of this invention is to provide test equipment for constant speed drive and alternator systems that has a very low drift.

A still further object of this invention is to provide a test equipment for a constant speed drive and alternator system which requires no mechanical or electrical changes to the constant speed drive or alternator in order to test such system.

A still further object of this invention is to provide test equipment for testing constant speed drive and alternator systems that will measure transient frequency changes in the alternator output and yet remain insensitive to the voltage changes which accompany the transient frequency changes.

Another object of this invention is to provide test equipment for testing any device which provides a frequency output which will measure transient frequency changes in such output of very short duration.

In carrying out this invention in one form, transient frequency test equipment is provided having a multiplier device to which the output of the alternator of a constant speed drive and alternator system or other frequency devices may be connected. The frequency output of the frequency device is multiplied by the multiplier device to a sufficiently high frequency so that the filters which are necessary to provide a smooth output will have time constants short enough to respond to transient frequency changes of short duration without smoothing or eliminating such transients. The multiplied frequency is fed to a limiter means and then to a discriminator device which provides a voltage output. The output of the discriminator is fed to a comparator circuit where the voltage signals from the discriminator are compared and their differences indicated on a recorder or other means to determine the amount of frequency variation to the input of the test equipment.

This invention will be better understood from the following description taken in connection with the accompanying drawing wherein:

Figure 1 is a schematic diagram in block form of one embodiment of the transient frequency test equipment of this invention;

Figure 2 is a schematic diagram in block form of the test equipment of this invention showing the number of different units which may be utilized in this invention; and Figure 3 is an electrical schematic diagram of one form of this invention showing the electrical circuitry of the various devices shown in block form in Figures 1 and 2.

Referring to the drawing wherein like numerals are used to indicate like parts throughout and in particular with reference to Figure 1, there is shown a block 10 representing a frequency generating device. This invention in one form is shown as comprising a multiplier device 12 which is connected to the output of the frequency generating device and is used to multiply the frequency of the generator output. After the frequency has been multiplied to a sufficiently high frequency to provide the necessary short time constant filtering, it is fed to a limiter device 14 to provide an output wave-form of constant positive and negative voltage limits. This wave-form is fed to the discriminator 16, which will provide voltage outputs varying with the input frequency. These outputs are fed to a comparator 18 where the voltages are compared to determine any frequency changes of the generator output.

Figure 2 shows one form of the invention being used to test a constant speed drive and alternator system. In general, the constant speed drive and alternator systems used in present day aircraft are designed to provide a constant 400 cycle per second frequency output. It has been determined that a 6400 cycle per second frequency is desirable to obtain the necessary short time constants to filter and smooth the output of the discriminator and also provide the desired frequency response of the test equipment. Therefore, as shown in Figure 2, the 400 cycle per second output of the constant speed drive and alternator system 11 is fed to a first multiplier 12a where it is multiplied to 800 cycles per second. This 800 cycle signal is fed to a second multiplier 12b and multiplied to 1600 cycles per second, the 1600 cycle signal then being fed to a third multiplier 12c where it is multiplied to 3200 cycles per second. This signal in turn is fed to a fourth multiplier 12d where it is multiplied to the desired 6400 cycles per second. The output of the fourth multiplier 12d, which is a 6400 cycle per second signal, is fed to a limiter 14 where it is clipped at a constant positive and negative voltage level so that the output of the limiter 14 is a series of positive and negative rectangular pulses, that is a rectangular wave. The output of the limiter 14 is then fed to a tuned discriminator 17 which is tuned to one frequency above the 6400 cycle per second signal and another frequency below 6400 cycles per second. The tuned discriminator 17 is designed to provide positive and negative voltage outputs according to its response to the frequency of the input signal. The discriminator outputs are fed to an adder 20. At the adder circuit the positive and negative voltages are compared and when the input signal to the testing equipment is 400 cycles per second, the output of the adder 20 will be zero. As the input signal varies in frequency the output of the adder 20 will vary. A recorder 22 may be connected to the output of the adder and any changes in frequency of the alternator output may be seen as a voltage change on the recorder 22.

Figure 3 is an electrical schematic diagram of a preferred embodiment showing one form of electric circuitry which may be used in the various devices or circuits of this invention. Figure 3 shows circuitry which may be used beginning with the third multiplier 12c and showing the remainder of the devices or circuits of the test equipment of one embodiment of this invention. Of course, it will be understood that the multipliers 12a and 12b are similar to those described for 12c and 12d. The multiplier 12c comprises a transformer 24 having a primary winding 26 and a center tapped secondary 28. The input of the primary winding 26 is the 1600 cycle per second frequency output of the second multiplier 12b. This 1600 cycle per second signal appears on the secondary winding 28 and is full-wave rectified by a rectifier comprising the rectifiers 30 and 32, which may be diodes. The full-wave rectified signal is filtered by an L-C filter 34 which has a low Q and a broad band width to enable it to follow transient frequency changes of short duration. This 3200 cycle per second signal is amplified by tube 36, because of power loss in the low Q filter 34, and then fed to the primary winding 38 of a transformer 40. The 3200 cycle per second signal appears on the center tap secondary winding 42 and is then rectified by a full-wave rectifier having rectifiers 44 and 46, which may be diodes, to provide a 6400 cycle per second signal. The 6400 cycle per second signal is amplified by means of a tube 48. The amplified signal is then fed to a limiter 14 shown in the form of a tube 50. The tube 50 clips the 6400 cycle per second signal at a positive and negative limit of three volts, thereby providing a rectangular wave-form output varying from plus three volts to minus three volts.

The rectangular wave-form signal of the limiter 14, which has a frequency of 6400 cycles per second, is then fed to the discriminator 17 which is shown in the form of a tube 52 having tuned plate circuits 54 and 56. The tuned plate circuit 54 is tuned to a frequency of 8000 cycles per second while the tuned plate circuit 56 is tuned to a frequency of 4900 cycles per second. These tuned circuits are selected since they provide an overlapping band at the 6400 cycle per second frequency of the input signal from the limiter. As the signal from the limiter appears on the grids of tube 52, each of the tuned plate circuits 54 and 56 responds to the 6400 cycle per second signal causing a voltage to appear in these tuned plate circuits of substantially similar value, since the band widths of these tuned plate circuits overlap at the 6400 cycle per second frequency. The voltage from tuned plate circuit 54 is fed through a rectifier and filtering means comprising rectifier 58 poled as shown to pass positive current and the R-C filter 60 having a very short time constant which smooths the ripple in the rectified voltage from the tuned plate circuit 54. The voltage from tuned plate 56 is also fed to a rectifier and filtering circuit, which comprises a rectifier 62 poled as shown to pass negative current and filter 64 having a short time constant to smooth the ripple of the rectified voltage. The rectifying and voltage filter of tuned plate circuit 56 is also provided with a balancing potentiometer 66, the purpose of which will be hereinafter described. The rectified outputs of tuned plate circuits 54 and 56 are fed to an adder 20, which comprises tube 68 and tube 70, which are preferably cathode follower tubes. As the positive rectified voltage from tuned plate circuit 54 appears on the grid of cathode follower tube 68, current is caused to flow through resistor 72 in the cathode circuit thereof, providing a positive voltage at terminal or point 74. Similarly, the negative voltage from tuned plate circuit 56, when applied to the grid of tube 70, changes the current flow in the tube, thereby causing a negative voltage to appear at terminal or point 76. However, due to the normal functions of cathode follower tubes 68 and 70, when connected in circuit and being provided with the plate voltage of plus 250 volts and the cathode supply voltage of minus 150 volts, some positive voltage appears at both terminals 74 and 76 without any signal being applied to the grids of these tubes. Therefore, when the positive and negative voltages from tuned plate circuits 54 and 56, respectively, are applied to the grids of tubes 68 and 70, respectively, the effect is to make terminal 74 more positive and make terminal 76 less positive. Thus, the center tap terminal 78 between the terminals 74 and 76 will be of some positive potential with respect to ground. It is desirable to have terminal 78 at zero potential with respect to ground when the input to the test equipment of this invention is the desired 400 cycle per second frequency. Therefore, the balancing potentiometer 66 is provided.

With the input to the test equipment set at 400 cycles per second, the balancing pot 66 is adjusted to provide a sufficient negative potential to the grid of tube 70 to place connection or terminal 76 at the proper negative voltage to provide zero potential between terminal 78 and ground. Of course, terminal 78 will be zero potential with respect to ground when the milliammeter 80 connected between terminal 78 and ground has a zero reading. When the milliammeter 80 reads zero after the original balancing, the input to the test equipment is 400 cycles per second. It should be understood that filter 60 and 64 are not large enough to completely filter the ripple from the rectified voltage of the tuned plate circuits 54 and 56. Therefore, additional filtering means are provided in the form of capacitors 82, 84, and 86. These three capacitors with resistor 88 provide a second filtering and have varying time constants with capacitor 82 giving the shorter time constant, capacitor 84 an intermediate time constant, and capacitor 86 having the longest time constant. For normal operation, the short time constant of capacitor 82 is used. However, if there is noise or instability in the alternator, then either of the longer time constants may be used, although the response of the test equipment will be lowered. In the short time constant position, the instrument will follow the extremely short transient frequency changes in the input.

It is well known that meters, such as the milliammeter 80, have a very slow response and in general are insufficient to indicate any rapid transients. Therefore, a recorder or other rapid responsive device can be attached to connections 89 and 90 to provide the necessary indication of any transient frequency changes in the input of the test equipment. Of course, when the input to the test equipment is 400 cycles, no voltage will appear across connections 89 and 90 and, therefore, the device attached thereto will be at zero. However, as the input frequency varies, a potential appears across terminals 89 and 90 and, therefore, a device such as a recorder 22 connected thereto will provide a voltage reading to indicate the frequency change.

The operation of the test equipment hereinbefore described should be readily understood from the description of the various circuits used therein. However, a brief description of the functions of the tuned plate circuits 54 and 56 will be given to insure a complete understanding of their operation. The tuned plate circuit 54 is tuned to a frequency of 8000 cycles per second, thereby providing a band width response over a frequency of approximately 5000 to 11,000 cycles per second. As is well understood by those skilled in the art, as the frequency of the current flowing through the tuned circuit approaches its resonant frequency, a larger voltage appears across the tuned circuit. Similarly, tuned plate circuit 56 has a band width response from approximately 2300 to 7500 cycles per second. Of course, as the frequency of the signal flowing through this tuned circuit approaches its resonant frequency, a larger voltage appears across the tuned circuit. Conversely, as the frequency of the current flowing through either tuned plate circuit goes away from the resonant frequency of the tuned circuit, a smaller voltage appears across that tuned circuit. Since the band widths of these two tuned circuits overlap at approximately 6400 cycles per second, when the tuned circuits 54 and 56 respond to a 6400 cycle per second signal, an approximately equal voltage will appear in each circuit. Should the signal vary from 6400 cycles per second, for example, should it increase to 6480 cycles per second, that is, the input signal increases to 405 cycles per second, the tuned plate circuit 54, which is tuned to 8000 cycles per second, will have a larger voltage potential than at 6400 cycles per second since the current flowing through it is closer to its resonant frequency. Also, the tuned plate circuit 56, which is tuned to 4900 cycles per second, will have a lower voltage across it since the frequency of the current flowing through it is moving further away from its resonant frequency. Therefore, the output voltage of the tuned plate circuit 54 will increase under these conditions while the output voltage from the tuned plate circuit 56 will decrease. With an increase in the output voltage of tuned plate circuit 54, the rectified voltage appearing on the grid of tube 68 increases, making terminal 74 more positive. Also, as the output voltage from tuned plate circuit 56 decreases, the negative voltage on the grid of tube 70 decreases and terminal 76 becomes less negative. Therefore, terminal 78 will have a positive potential with respect to ground, and a current will be caused to flow through milliammeter 80 and will provide a reading should the frequency change be of sufficiently long duration. However, even for very short frequency changes, such as the increase in frequency of the above example, the terminal 78 will be momentarily positive with respect to ground, thereby providing a voltage output between terminals 88 and 90. A recorder of sufficiently rapid response, such as a Brush Recorder, connected to points 88 and 90, would thereby have a positive voltage reading for such transient frequency increase. Of course, the tuned plate circuits 54 and 56 operate in similar manner for a decrease in the 6400 cycle per second signal to provide a negative voltage indication at connections 88 and 90 and the recorder attached thereto.

The transient frequency meter of this invention provides a linear voltage output when the input frequency varies from 360 to 440 cycles per second. Also, by selecting the shortest time constant possible for adequate filtering in the various filter circuits of the test equipment, the transient frequency meter responds to transient frequency changes having a duration of only 0.01 second. The sensitivity of the meter of this invention to signal voltage variations was checked with a constant input frequency of 440 cycles per second. The A.C. input was varied from 60 volts to 130 volts R.M.S., and it was found that the output remained constant at 2.3 volts D.C., positive. With the proper selection of the various circuit components, there is substantially no drift in the transient frequency meter output.

From the above it can be seen that the transient frequency meter of this invention provides a test equipment that can be used to test the output of constant speed drive and alternator systems or other types of frequency generators and will indicate any transient frequency changes in the generator output regardless of the duration of such frequency change. From the foregoing it is apparent that the device of this invention fulfills all the objectives set forth herein and provides a positive test device for constant speed drive and alternator systems, and other frequency generating devices.

It will be obvious to those skilled in the art that many changes can be made in the electrical circuitry described herein such as, for example, the use of transistors in place of tubes, providing other types of rectifying devices, and the like. Of course, other types of discriminators and limiters could be used if desired. These and other changes may be made without departing from the spirit and scope of this invention as defined in the appended claims.

What is claimed as new and which is desired to secure by Letters Patent of the United States is:

1. A transient frequency meter for testing constant speed drive and alternator systems comprising, a multiplier device adapted to be connected to the output of the alternator of said system, said multiplier device designed to multiply the frequency of the alternator to a comparatively high frequency, a limiter means connected to the output of the multiplier for limiting the high-frequency output signal of the multiplier device to a rectangular wave-form of low voltage, a discriminator connected to receive the output of the limiter to generate voltages proportional to the frequency of the signal from the limiter, filter means for filtering the output of said discriminator and having short time constants which allow the device to respond to frequency transients of short duration, comparator means for comparing said discriminator's outputs, means connecting the output of the discriminator to the comparator means, said means including means to vary said voltage output to provide a null indication in said comparator means when said alternator output is at a desired frequency, thereby when said alternator output is of a frequency other than said desired frequency said comparator means gives an indication of such frequency change.

2. A transient frequency meter adapted for testing constant speed drive and alternator systems comprising, a multiplier device adapted to be connected to the alternator output of said system, said multiplier multiplying the frequency of the alternator output to a comparatively high frequency, limiter means connected to said multiplier for limiting the high frequency output to a rectangular wave-form of low voltage, a discriminator for receiving the output of said limiter, said discriminator being provided with two tuned discriminating circuits, said tuned discriminating circuits being tuned to frequencies on either side of the frequency of the rectangular waveform such that when the alternator is at the desired frequency the output of the tuned discriminating circuits will be substantially equal in voltage, rectifier means to rectify the output of each said tuned circuit, filter means in the output of each said tuned discriminating circuit for providing a smooth D.-C. output, said filter means having a short time constant whereby it responds to short transient frequencies, and comparator means for comparing the voltages out of said discriminator, whereby when said alternator output is at the desired frequency said comparator gives a zero indication and when said alternator output varies to some frequency other than said desired frequency said comparator means provides a voltage indication.

3. A transient frequency meter adapted for testing constant speed drive and alternator systems comprising, a multiplier device adapted to be connected to the alternator output of said system, said multiplier multiplying the frequency of the alternator output to a comparatively high frequency, limiter means connected to said multiplier for limiting the high frequency output to a rectangular wave-form of low voltage, a discriminator for receiving the output of said limiter, and converting it into voltages proportional to the frequency of said limiter, filter means in the output of said discriminating circuit for providing a smooth D.-C. output, said filter means having a short time constant whereby it responds to short transient frequencies, and comparator means for comparing the voltages out of said discriminator, whereby when said alternator output is at the desired frequency said comparator gives a zero indication and when said alternator output varies to some frequency other than said desired frequency said comparator means provides a voltage indication.

4. A transient frequency meter for testing constant speed drive and alternator systems comprising, a multiplier device adapted to be connected to the output of the alternator of said system, said multiplier device designed to multiply the frequency of the alternator to a relatively high frequency, a limiter means connected to the output of the multiplier for limiting the high frequency output signal of the multiplier device to a rectangular waveform of low voltage, a tuned discriminator connected to receive the output of the limiter, said discriminator having two tuned circuits, one tuned circuit being tuned to a lower frequency than the frequency of the rectangular wave-form and the other tuned circuit being tuned to a comparatively higher frequency than the rectangular wave-form frequency, said one tuned circuit being designed to give a negative voltage output and said other tuned circuit being designed to give a positive voltage output, filter means for filtering the output of said tuned discriminator and having short time constants to respond to frequency transients of short duration, comparator means for comparing said positive and negative voltage outputs, means connecting the output of the discriminator to the comparator means, said means including means to vary said negative voltage output to provide a null indication in said comparator means when said alternator output is at a desired frequency, thereby when said alternator output is of a frequency other than said desired frequency said comparator means gives an indication of such frequency change.

5. A transient frequency meter for detecting transient frequencies of short duration in the output of a frequency generating device comprising in combination a multiplier, a limiter, a discriminator and a comparator connected in series circuit with the output of said frequency generating device, said multiplier multiplying the frequency output of said frequency generating device to a relatively high frequency, said limiter limiting the high frequency output of said multiplier to a low voltage, high frequency rectangular wave, said discriminator being provided with filter means having short time constants for providing voltage outputs proportional to the frequency of said limiter output and said comparator comparing said voltage outputs whereby as the frequency of said frequency generator device varies the voltage outputs of said discriminator vary proportional thereto and said comparator provides an indication of such voltage variations.

6. A transient frequency meter for detecting transient frequency changes of short duration in the output of a frequency generating device comprising in combination a multiplier, a limiter, a discriminator and a comparator connected in series circuit relation, said multiplier adapted to be connected to the output of said frequency generator for multiplying the output of said generator to a relatively high frequency, said limiter being designed to limit the output of said multiplier to a low voltage, high frequency rectangular wave, said discriminator being provided with tuned circuits responsive to transient frequency changes of said generator output and including filter means having short time constants to respond to frequency transients of short duration, for providing voltage outputs proportional to such transient frequency changes and said comparator comparing the voltage outputs of said tuned circuits, whereby transient frequency changes in the output of said frequency generating device are indicated by said comparator.

7. A transient frequency meter adapted to detect transient frequency changes of short duration in the output of a frequency generating device comprising, a multiplier adapted to be connected to the output of said frequency generating device for multiplying its frequency output, low "Q" filter means in said multiplier enabling said multiplier to multiply transient frequency changes of short duration, a limiter means in series with said multiplier for limiting the voltage of the output of said multiplier while having its frequency unchanged, discriminator means in series with said limiter means, said discriminator having tuned circuits providing voltage outputs and including filter means having short time constants to respond to frequency transients of short duration, which vary with the frequency of said limiter output and comparing means in series with said tuned circuits for comparing the voltage outputs of said tuned circuits, said comparing means being so constructed and arranged that when said frequency generating device is generating a signal of a desired frequency said comparing means provides a null indication and when said frequency generating device generates a signal having a transient frequency other than said desired frequency said comparing means provides a voltage indication of such transient frequency.

References Cited in the file of this patent

UNITED STATES PATENTS

| | | |
|---|---|---|
| 2,232,858 | Lane | Feb. 25, 1941 |
| 2,324,077 | Goodale | July 13, 1943 |
| 2,425,811 | Kent | Aug. 19, 1947 |
| 2,510,531 | Trevor | June 6, 1950 |
| 2,679,629 | Hellar | May 25, 1954 |
| 2,816,229 | Vantine | Dec. 10, 1957 |

FOREIGN PATENTS

| | | |
|---|---|---|
| 712,527 | Great Britain | July 28, 1954 |